United States Patent
Yard

(10) Patent No.: US 7,836,424 B2
(45) Date of Patent: Nov. 16, 2010

(54) ANALYZING ERP CUSTOM OBJECTS BY TRANSPORT

(75) Inventor: Thomas L. Yard, Apalachin, NY (US)

(73) Assignee: International Business Machines Corporation, Armonk, NY (US)

( * ) Notice: Subject to any disclaimer, the term of this patent is extended or adjusted under 35 U.S.C. 154(b) by 1084 days.

(21) Appl. No.: 11/535,231

(22) Filed: Sep. 26, 2006

(65) Prior Publication Data

US 2008/0127138 A1      May 29, 2008

(51) Int. Cl.
    *G06F 9/44* (2006.01)
(52) U.S. Cl. .................. 717/103; 717/108; 717/116; 717/124; 717/154
(58) Field of Classification Search .............. 717/103
    See application file for complete search history.

(56) References Cited

U.S. PATENT DOCUMENTS

| | | | |
|---|---|---|---|
| 6,256,676 B1 * | 7/2001 | Taylor et al. | 709/246 |
| 6,701,514 B1 | 3/2004 | Haswell et al. | |
| 6,789,252 B1 * | 9/2004 | Burke et al. | 717/100 |
| 2002/0029377 A1 | 3/2002 | Pavela | |
| 2004/0143819 A1 | 7/2004 | Cheng et al. | |
| 2004/0148309 A1 * | 7/2004 | Resch | 707/102 |
| 2005/0010905 A1 | 1/2005 | Noirot-Nerin | |
| 2005/0114839 A1 | 5/2005 | Blumenthal et al. | |
| 2005/0203975 A1 * | 9/2005 | Jindal et al. | 707/204 |
| 2005/0257198 A1 | 11/2005 | Stienhans et al. | |
| 2005/0283761 A1 | 12/2005 | Haas | |

* cited by examiner

*Primary Examiner*—Thomas K Pham
(74) *Attorney, Agent, or Firm*—John Pivnichny; Hoffman Warnick LLC

(57) ABSTRACT

The invention is directed to analyzing enterprise resource planning (ERP) custom objects by transport. A method in accordance with an embodiment of the present invention includes: providing a development box, wherein the development box includes: a listing of a plurality of ERP object modifications from a plurality of transport versions; an output including at least one of an ERP object summary and a transport summary; and a proposal for transporting of at least one of the plurality of ERP object modifications, wherein the proposal is derived from the output; providing at least one of: a test box or a production box; comparing the development box to at least one of the test box and the production box; and transporting the at least one of the plurality of ERP object modifications.

7 Claims, 1 Drawing Sheet

ANALYZING ERP CUSTOM OBJECTS BY TRANSPORT

BACKGROUND OF THE INVENTION

1. Field of the Invention

The present invention generally relates to transactions for enterprise resource planning (ERP) software applications, such as SAP. More specifically, the present invention is directed to a method, system, and computer program stored on a computer-readable medium for analyzing ERP custom objects by transport.

2. Related Art

Currently, available functions with ERP software applications, such as SAP (SAP AG, based in Walldorf, Germany), handle transporting custom code objects to production and analysis of these transports at the transport level, but they do not provide necessary and/or desired analysis at the object level.

When developing and/or customizing ERP applications, such as SAP and/or advanced business application programming (ABAP) code, it often entails installing code in several releases per year, in smaller releases, independent installs, code fixes, etc. SAP is defined herein to include various ERP software applications provided by SAP AG including R/3 and/or other applications related to a business suite. Often when installing the various code(s), a number of objects may need to be evaluated at once, based on code developed or modified by a number of different programmers, often including multiple changes (fixes) to the same individual code object(s). This evaluation and analysis can be cumbersome and result in various code being lost in translation and/or being missed before/during transport.

Therefore, in order to have more functionality than currently provided in the native SAP transactions, it would be desirous to have the ability to quickly compare many objects from one box to another in the landscape (e.g., from the development box to a test box, or from development box to the production box) and to also verify code versions after installation in order to demonstrate that various criteria/standards, such as those from software engineering institute (SEI), are being met.

Accordingly, a need exists for an improvement in the art of analyzing the transporting of custom objects in ERP.

SUMMARY OF THE INVENTION

The present invention is directed to a method, system, and computer program product for analyzing enterprise resource planning (ERP) custom objects by transport.

A first aspect of the present invention is directed to a method for analyzing ERP custom objects, comprising: providing a development box, wherein the development box includes: a listing of a plurality of ERP object modifications from a plurality of transport versions; an output including at least one of an ERP object summary and a transport summary; and a proposal for transporting at least one of the plurality of ERP object modifications, wherein the proposal is derived from the output; providing at least one of: a test box or a production box; comparing the development box to at least one of: the test box or the production box; and transporting the at least one of the plurality of ERP object modifications from the development box to at least one of: the test box or the production box.

A second aspect of the present invention is directed to a system for analyzing enterprise resource planning (ERP) custom objects, comprising: a system for providing a development box, wherein the development box includes: a listing of a plurality of ERP object modifications from a plurality of transport versions; an output including at least one of an ERP object summary and a transport summary; and a proposal for transporting at least one of the plurality of ERP object modifications, wherein the proposal is derived from the output; a system for providing at least one of: a test box or a production box; a system for comparing the development box to at least one of: the test box or the production box; and a system for transporting the at least one of the plurality of ERP object modifications from the development box to at least one of: the test box or the production box.

A third aspect of the present invention is directed to a computer program stored on a computer-readable medium, which when executed, enables a computer system to analyze ERP custom objects by transport, the computer program comprising program code for enabling the computer system to: provide a development box, wherein the development box includes: a listing of a plurality of ERP object modifications from a plurality of transport versions; an output including at least one of: an ERP object summary or a transport summary; and a proposal for transporting of at least one of the plurality of ERP object modifications, wherein the proposal is derived from the output; provide at least one of: a test box or a production box; compare the development box to at least one of: the test box or the production box; and transport the at least one of the plurality of ERP object modifications from the development box to at least one of: the test box or the production box.

The illustrative aspects of the present invention are designed to solve the problems herein described and other problems not discussed.

BRIEF DESCRIPTION OF THE DRAWINGS

These and other features of this invention will be more readily understood from the following detailed description of the various aspects of the invention taken in conjunction with the accompanying drawing in which.

Figure 1:
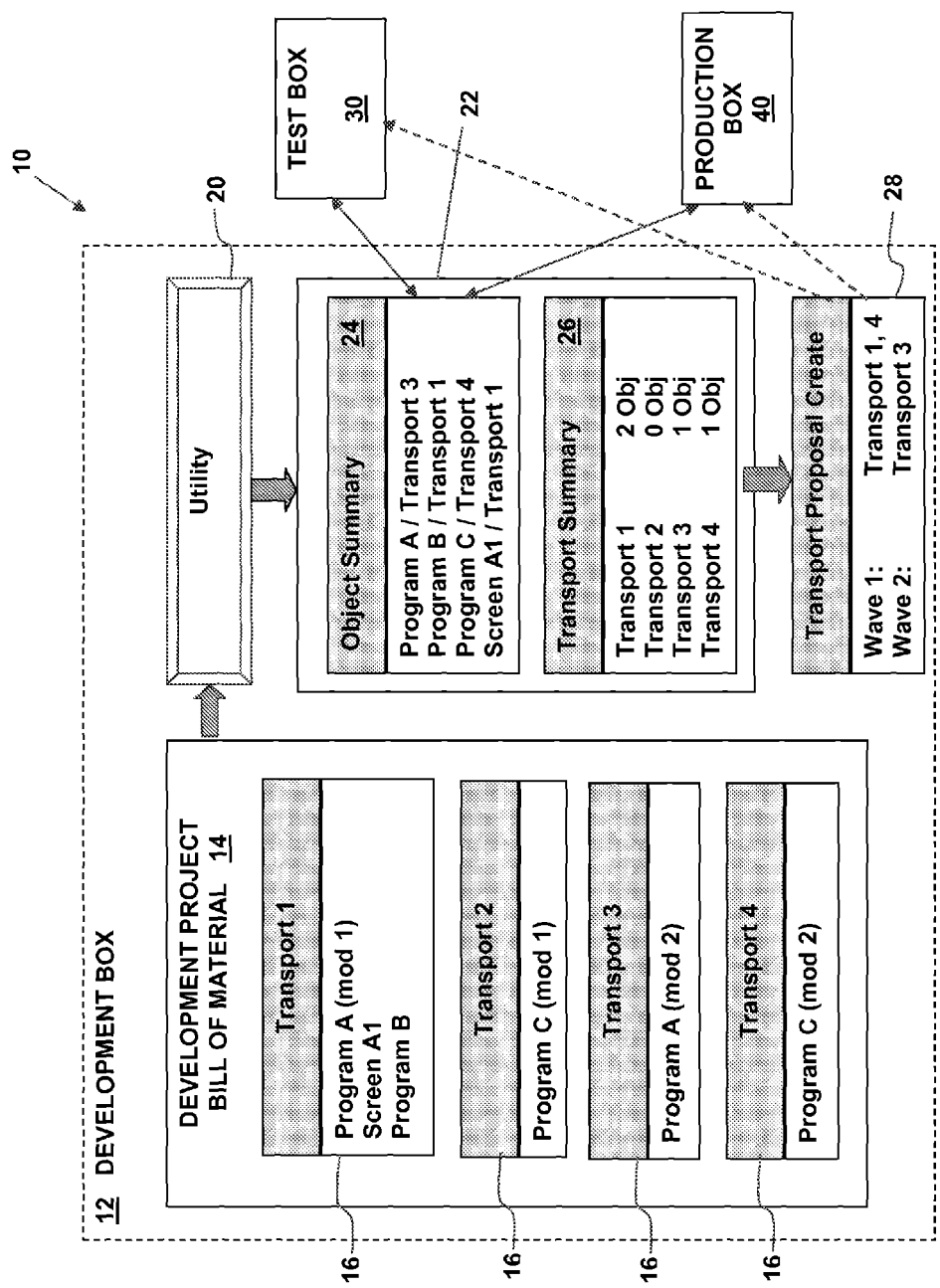
FIG. 1 depicts an environment employing a method, system, and computer program product stored on a computer-readable medium for analyzing SAP custom objects by transport in accordance with an embodiment of the present invention.

The drawing is merely a schematic representation, not intended to portray specific parameters of the invention. The drawing is intended to depict only a typical embodiment of the invention, and therefore should not be considered as limiting the scope of the invention.

DETAILED DESCRIPTION OF THE INVENTION

As detailed above, the present invention is directed to a method, system, and computer program product for analyzing enterprise resource planning (ERP) custom objects by transport.

In accordance with the present invention, embodiments herein solve problems related to managing installations and transports of custom objects, such as SAP/advanced business application programming (ABAP) code objects, and automating various functionalities. Aspects of the invention perform verification of code upon install, in order to ensure that code is ready for customer check-out and use. Aspects of the present invention allow the user to compare the "version" (e.g., transport id) of code objects from one SAP box to another within the SAP landscape, and through to the production box. This allows a user to readily analyze and verify if the code version is as expected. Additionally, reports to demonstrate the control over the installation process may be provided so as to show software engineering institute (SEI) compliance, may be provided.

Aspects of the present invention allow for comparing the detail lines of code at several stages throughout software development. For example, comparisons of code from the development box to that on a production box and/or comparisons of code from the pre-production test box compared to production box are available.

An illustrative environment for employing the method and computer program stored on a computer-readable medium in accordance with an embodiment of the present invention is depicted in FIG. 1. The environment 10 includes a development box 12, a test box 30, and a production box 40 for use with enterprise resource planning (ERP) software, such as SAP. The development box 12 includes a transport list (e.g., development project bill of material) 14, and a utility 20. In each transport list 14 may be a plurality of groups 16 of custom objects for transport. For example, FIG. 1 includes four (4) different groups 16 (i.e., Transport 1, Transport 2, Transport 3, Transport 4). Within each group 16, may be one, or more, of any custom objects, selected from a group consisting of: programs, screen, data dictionary definitions, and/or the like. For example, Transport 1 includes program code changes (i.e., Program A (mod 1), Program B) and screen changes (i.e., Screen A1). Similarly, Transport 2 includes program code changes (i.e., Program C (mod 1)), Transport 3 includes program code changes (i.e., Program A (mod 2)), and Transport 4 includes program code changes (i.e., Program C (mod 2)).

The transport list 14 (e.g., Bill of Material) is built, or provided, for a release over a period of time, and may be used to drive installation functions, such as creating proposals to install proposed changes. The transport list 14 may be managed externally to SAP, such as via data in a spreadsheet. In this manner, aspects of the invention include importing a file containing the transport list 14, and saving the transport list 14 for later reprocessing, such as with an SAP program variant. The transport list 14 for a particular release may change over time, thereby allowing proposals to be created and/or recreated quickly.

Input to the transport list 14 can be from a number of sources that identify transports individually including any selected from a group consisting of: transport number, owner, status, object name(s), proposal and/or project number. Input can also be from a file, such as spreadsheet that has been saved as the text version.

A proposed transporting summary 22 may include an object summary 24 and a transport summary 26. The object summary 24 includes a hierarchical arrangement of the various proposed custom objects derived form the transport list 14 wherein the various custom objects are listed and their respective group 16. For example, Program A/Transport 3 is a listing connoting that from Transport 3 16, that program code changes "Program A" are proposed for transport. This hierarchy is presented because modifications to Program A are presented at both Transport 1 and Transport 3. However, the modifications to Program A from Transport 3 supplant those from Transport 1. Therefore, the custom objects for Program A from the third transport (i.e., Transport 3) 16 (i.e., Program A (mod 2)) are a more recent change than those from the first transport (i.e., Transport 1) 16 (i.e., Program A (mod 1)). Similarly, custom objects for Program C from Transport 4 are listed in the object summary 24. As with Program A, the modifications for Program C from Transport 4 supplant those from Transport 2. Also, the object summary 24 includes a listing of Program B from Transport 1 and Screen A1 from Transport 1.

The transport summary 26 includes a listing of the various custom objects that are proposed for transport that are derived from the object summary 24 arranged and/or sorted by group 16. Thus, objects from Transport 1, Transport 3 and Transport 4 are listed for proposed transport. In other words, no objects from Transport 2 (i.e., Program C (mod 1)) are being proposed for transport because program C (mod 1) is supplanted by Program C (mod 2), as listed in the object summary 24. In this manner, the invention is able to collect all objects in scope per the input criteria, and summarizes to show the latest version of each object. (That is, for an object that has been changed more than once for the release, only the latest transport/version is reported.)

Optionally, proposals 28 which include a level of packaging for transporting that may include proposed transports for a release may be part of the development box 12. FIG. 1 shows a proposal 28, entitled "Transport Proposal Create", which includes two (2) waves, wherein Wave 1 includes Transport 1 and Transport 4 and Wave 2 includes Transport 3.

As shown in FIG. 1, once the development box 12 is provided and/or created, a user is able to compare contents of the development box 12 with those of either, or both, the test box 30 and/or the production box 40.

If desired, the user may then transport one, all, and/or a partial amount of the proposed ERP object modifications (e.g., custom objects) from the development box 12 to the either, or both, the test box 30 and/or the production box 40.

Aspects of the present invention produce a concise summarization of objects affected for each release, for information technology (I/T) use and/or for customer use.

If requested, for each of the objects, the invention may gather version information from other remote SAP box(es) in the landscape, in order to allow for visual comparison of the versions at each box (e.g., development box 12, test box 30, production box 40). Therefore, at a quick glance from the development box 12, one can review if the code version is as expected on any of the customer test or production boxes 30, 40. Further, reports may be generated thereby demonstrating control exerted over the installation process, for SEI compliance.

When doing a box-to-box comparison, the program analyzes the transport logs, and shows a visual status of the transport with, for example, red/yellow/green for quick analysis for transport problems.

The program allows easy "one touch" detail (line-by-line) compare of the object(s) from one SAP box to another within the SAP landscape, and through to the production box 40. This function is provided for individual object(s) by cursor select/double-click, or for all objects in scope of the program execution by simply pushing one button. The latter function presents compare detail of each object, one after the other, and expedites the review process.

The program performs dependency analysis on transports that are to be applied to a given SAP box, and detects those transports that have overlapping objects. For this, the program determines "waves" of transports to be installed, such that when the waves are applied in order, no "out of order" conditions will occur, and therefore ensures that the final version of the each object is correct at installation.

The program allows quick and easy creation (or re-creation) of SAP Transport Proposals, from the transports in scope, therefore allowing IT personnel to create proposals more rapidly than otherwise possible, especially for a large release.

The program provides "collision" analysis between the objects from more than different sources (Projects, Proposals, etc.) This function is useful for providing analysis when changes occur to the installation scope, such as when one scenario must be separated from the Release for which is was originally planned.

The foregoing description of the embodiments of this invention has been presented for purposes of illustration and description. It is not intended to be exhaustive or to limit the invention to the precise form disclosed, and many modifications and variations are possible.

What is claimed is:

1. A method for analyzing enterprise resource planning (ERP) custom objects, comprising:
   providing a development box of transport eligible objects, wherein the development box includes:
      a listing of a plurality of ERP object modifications from a plurality of transport versions, at least two of the plurality of ERP object modifications being related to an individual code object;
      an output including at least one of an ERP object summary and a transport summary, the output eliminating all but a latest version of the at least two of the plurality of EPR object modifications; and
      a proposal for transporting at least one of the plurality of ERP object modifications,
   wherein the proposal is derived from the output;
   providing at least one of: a test box or a production box;
   comparing, using a computer device, the development box to the at least one of: the test box or the production box at an object level to determine whether a version of an object for transport in the development box is an expected version; and
   transporting the at least one of the plurality of ERP object modifications from the development box to the at least one of: the test box or the production box.

2. The method of claim 1, further comprising:
   eliminating at least one redundant transport version.

3. The method of claim 1, wherein the ERP is one selected from a group consisting of SAP and advanced business application programming (ABAP).

4. The method of claim 1, wherein the ERP objects include at least one selected from a group consisting of: a program modification and a screen modification.

5. A system for analyzing enterprise resource planning (ERP) custom objects, comprising:
   a system for providing a development box of transport eligible objects, wherein the development box includes:
      a listing of a plurality of ERP object modifications from a plurality of transport versions, at least two of the plurality of ERP object modifications being related to an individual code object;
      an output including at least one of an ERP object summary and a transport summary, the output eliminating all but a latest version of the at least two of the plurality of EPR object modifications; and
      a proposal for transporting at least one of the plurality of ERP object modifications, wherein the proposal is derived from the output;
   a system for providing at least one of: a test box or a production box;
   a system for comparing the development box to at the least one of: the test box or the production box at an object level to determine whether a version of an object for transport in the development box is an expected version; and
   a system for transporting the at least one of the plurality of ERP object modifications from the development box to the at least one of: the test box or the production box.

6. A computer program stored on a computer-readable storage medium, which when executed, enables a computer system to analyze ERP custom objects by transport, the computer program comprising program code for enabling the computer system to:
   provide a development box of transport eligible objects, wherein the development box includes:
      a listing of a plurality of ERP object modifications from a plurality of transport versions, at least two of the plurality of ERP object modifications being related to an individual code object;
      an output including at least one of ERP object summary and a transport summary, the output eliminating all but a latest version of the at least two of the plurality of EPR object modifications; and
      a proposal for transporting of at least one of the plurality of ERP object modifications, wherein the proposal is derived from the output;
   provide at least one of a test box and a production box;
   compare the development box to at the least one of the test box and the production box at an object level to determine whether a version of an object for transport in the development box is an expected version; and
   transport the at least one of the plurality of ERP object modifications.

7. The computer program of claim 6, wherein ERP is SAP or ABAP.

* * * * *